United States Patent [19]

Bussiere

[11] Patent Number: 6,041,042
[45] Date of Patent: Mar. 21, 2000

[54] REMOTE PORT MIRRORING SYSTEM AND METHOD THEREOF

[75] Inventor: Richard Bussiere, Manchester, N.H.

[73] Assignee: Cabletron Systems, Inc., Rochester, N.H.

[21] Appl. No.: 08/863,806

[22] Filed: May 27, 1997

[51] Int. Cl.[7] .............................. H04J 3/14; H04L 12/56
[52] U.S. Cl. ........................................ 370/245; 370/401
[58] Field of Search .................................... 370/389, 390, 370/392, 400, 401, 404, 471, 474, 242, 244, 245, 249, 250; 340/827

[56] References Cited

U.S. PATENT DOCUMENTS

| | | | |
|---|---|---|---|
| 4,897,841 | 1/1990 | Gang, Jr. ................................. | 370/401 |
| 4,939,509 | 7/1990 | Bartholomew et al. ................. | 370/62 |
| 5,115,495 | 5/1992 | Tsuchiya et al. ....................... | 370/94.1 |
| 5,151,897 | 9/1992 | Suzuki .................................... | 370/401 |
| 5,195,087 | 3/1993 | Bennett et al. ......................... | 370/62 |
| 5,274,631 | 12/1993 | Bhardwaj ............................... | 370/401 |
| 5,299,257 | 3/1994 | Fuller et al. ............................ | 379/100 |
| 5,305,312 | 4/1994 | Fornek et al. .......................... | 370/62 |
| 5,315,580 | 5/1994 | Phaal ...................................... | 370/17 |
| 5,357,508 | 10/1994 | Le Boudec et al. ................... | 370/60.1 |
| 5,485,455 | 1/1996 | Dobbins et al. ........................ | 370/60 |
| 5,509,123 | 4/1996 | Dobbins et al. ........................ | 395/200.15 |
| 5,515,376 | 5/1996 | Murthy et al. ......................... | 370/402 |
| 5,627,819 | 5/1997 | Dev et al. .............................. | 370/250 |

FOREIGN PATENT DOCUMENTS

| | | | |
|---|---|---|---|
| 0453128 A2 | 10/1991 | European Pat. Off. ........ | H04L 12/56 |
| 0462691 | 12/1991 | European Pat. Off. ........ | H04L 12/26 |
| WO 95/34158 | 12/1995 | WIPO ............................ | H04M 3/22 |

OTHER PUBLICATIONS

JP,A,61 263350, Nov. 21, 1986, Patent Abstracts of Japan vol. 011, No. 117 (E–498) Apr. 11, 1987 (Hitachi Ltd).

*Primary Examiner*—Chau Nguyen
*Assistant Examiner*—Soon-Dong Hyun
*Attorney, Agent, or Firm*—Wolf, Greenfield & Sacks, P.C.

[57] ABSTRACT

Method and apparatus for remote monitoring of data on a communications network, wherein data transmitted and received by a port can be examined at a location other than on the device having the examined port. A method includes the steps of selecting a mirror-from-port of a first device from which to mirror packets, selecting an analyzer port of a second device to which to mirror the packets, and mirroring the packets from the mirror-from-port of the first device to the analyzer port of the second device. The mirroring step may include establishing a connection path through the network, encapsulating the packets with a connection path identifier, and sending the encapsulated packets through the network to the second device. The benefits include ease of use, fewer resources (analyzers) needed, time savings, and not having to dedicate a physical port as the mirror-to-port on the device.

17 Claims, 5 Drawing Sheets

REMOTE PORT MIRRORING SYSTEM AND METHOD THEREOF

FIELD OF THE INVENTION

This invention relates to methods and apparatus for remote diagnosing or monitoring of data on a communications network, and more particularly to a system and method wherein data transmitted or received by a port can be examined at a location other than on the device having the examined port.

BACKGROUND OF THE INVENTION

As businesses have realized the economic advantages of sharing expensive computer resources, cabling systems (both physical and wireless) have proliferated to enable the sharing of such resources over a network. A local area network, or "LAN, refers to an interconnected data network that is usually confined to a moderately-sized geographical area, such as a single office building or a campus area. Larger networks are often referred to as wide area networks or "WANs."

Networks may be formed using a variety of different interconnection elements, such as unshielded twisted pair cables, shielded twisted pair cables, coaxial cable, fiber optic cable, and wireless interconnection elements. The configuration of these cabling elements, and the interfaces for the communications medium, may follow one or more topologies such as a star, ring, bus or mesh.

Figure 1:
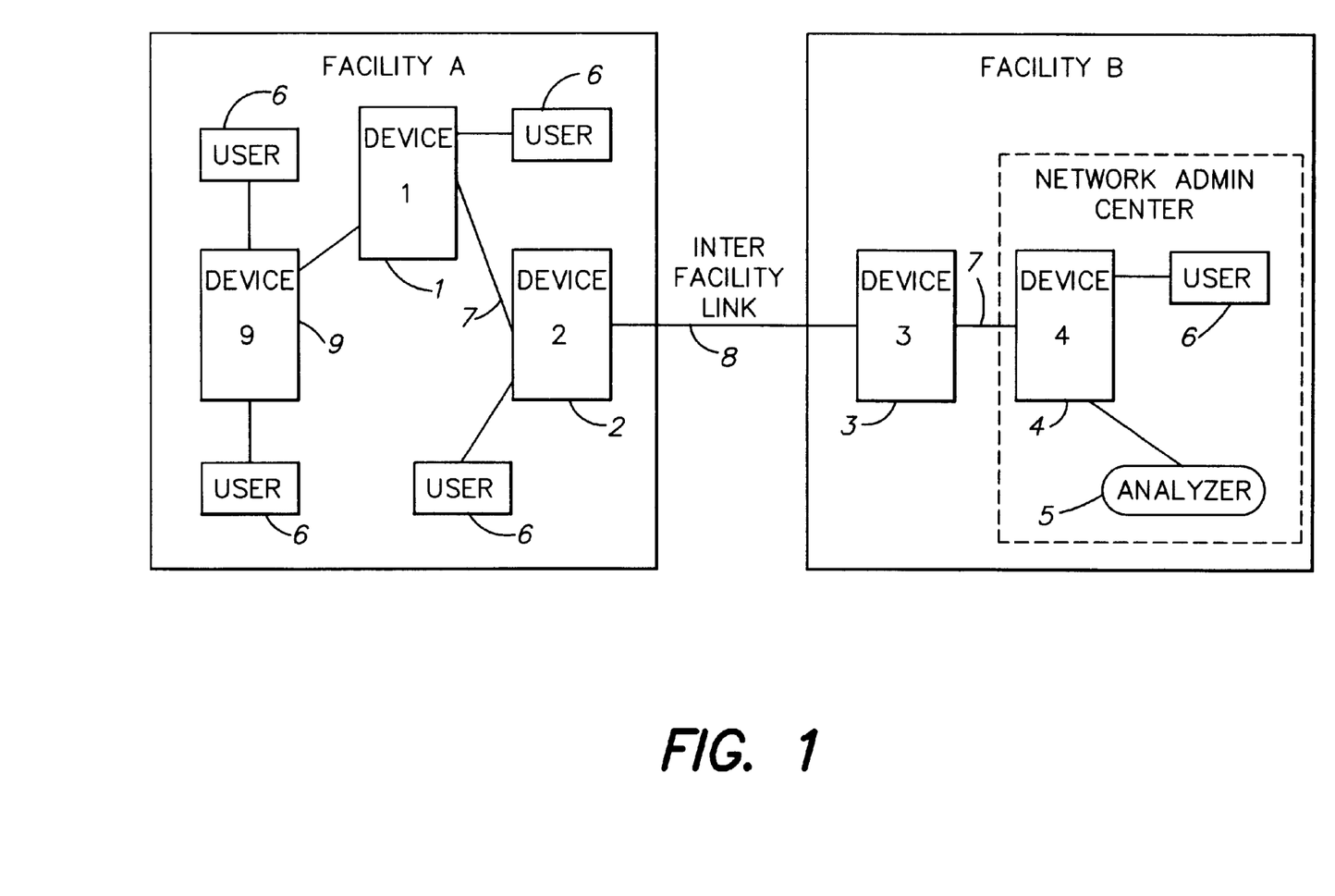
FIG. 1 is a block level diagram of one example of a network.

FIG. 1 illustrates one example of a communications network. Facility A has four user devices 6 connected by links to network devices 1, 2 and 9. Facility A, for example, may be a building on a campus or a separate floor within a building. Facilty B, at a separate geographic location, has one user device 6 and an analyzer 5, each connected by links 7 to network devices 3, 4. User devices (or end stations) 6 may be a personal computer, printer, CAD/CAM workstation, or any other device to be connected to other devices by the network. Intermediary devices 1–4 and 9 are used to direct communications in the network. These devices may correspond to switches, routers, bridges or any other device that selectively directs communications in a network.

Facilities A and B are interconnected through an inter-facility link 8. Each of links 7 and 8 may be interconnection 97 element as previously described. The devices in each facility may be connected in any topology. Through the intrafacility (links 7) and interfacility (link 8) connections, any user can share resources available to any other user in the network.

Port mirroring is defined as the "copying" of all data received or transmitted on a given port to another port on the same device, for the purposes of monitoring or diagnosing a network. For example, suppose in the network of FIG. 1 a network administrator wishes to monitor activity to a port on device 1 in Facility A. The administrator has a network administration center in Facility B, and has resources such as analyzers located at this facility. Present implementations of port mirroring would require the administrator to transport the analyzer to Facility A, and physically attach the analyzer directly to device 1. He would then have to monitor the analyzer in this remote location.

Thus, as presently implemented, port mirroring presents the following limitations:

Requires that a dedicated "mirror port" be present on the same physical device as the port on which the surveillance is to be conducted; often, this will result in a reconfiguration of the network.

Requires that the monitoring equipment be co-located with the device that is being monitored; this often involves physical re-allocation of equipment.

Requires that network personnel be dispatched to the physical location of the device to perform monitoring activities.

In large campus-wide or corporate-wide networks, these activities are highly intrusive to the network administrator. It would thus be desirable to have a more convenient means of monitoring traffic on a device connected to a network.

SUMMARY OF THE INVENTION

The present invention is directed to a method and system for remote port mirroring, wherein an administrator is able to remotely monitor the traffic on a port of a network device. In one embodiment, a network administrator is able, using management software, to establish a path between an ingress device having a mirror-from-port (to be monitored), and a remote analyzing port on an egress device. This path, coupled with encapsulation and de-encapsulation support, makes it possible for all traffic seen on the port being monitored to be transmitted to a remote location for analysis. The benefits to the end user are substantial, including ease of use, fewer resources (i.e., analyzers) needed, time savings, and not having to have a physical port dedicated as the mirror-to-port on the device.

According to a method embodiment, the invention comprises the steps of:

selecting a first port of a first device from which to mirror packets;

selecting a first port of a second device to which to mirror the packets; and mirroring the packets from the first port of the first device to the first port of the second device by encapsulating the packets and sending the encapsulated packets through the network to the second device.

The first device encapsulates the packets, enabling them to be transmitted out the network to the second device; the second device de-encapsulates the encapsulated packets, and provides the same to an analyzer. The mirroring step may include establishing a connection path through a switched network from the first device to the second device and sending the encapsulated packets on the path. The step of encapsulating the packets may including adding a header which identifies the connection path.

In an apparatus embodiment, an ingress device is provided for remote port mirroring in a network, the ingress device comprising:

a mirror-from-port at which packets are transmitted or received;

a mirror-to-port; and means for mirroring the packets to a remote device in the network by encapsulating the packets to enable transmission to the remote device and sending the encapsulated packets out the mirror-to-port.

These and other features and benefits of the present invention will be more particularly understood from the following detailed description and drawings.

DETAILED DESCRIPTION

Conventional port mirroring is highly intrusive to the network administrator, especially in large networks, requiring his/her dispatch to the physical location of the device being monitored. Accordingly, there is great need for a network diagnostic system and method which does not require relocation of diagnostic devices and personnel to the physical location of the device to be monitored. Such a method and system could permit any device in a network (e.g. with reference to FIG. 1, devices 1–4, 6 and 9) to be monitored remotely by mirroring data from a monitored device (e.g., device 2) through the network, to analyzer 5, regardless of where analyzer 5 is located in the network.

FIGS. 2–5 illustrate generally the remote port mirroring scheme according to one embodiment of the present invention. While this embodiment is described in the context of a connection-oriented network, it is not intended to be limiting. Application to connectionless networks is within the scope of the present invention and could be readily implemented by those skilled in the art.

Connectionless and Connection-Oriented Communications

In a connectionless communication network, data packets are routed through devices independently, based on a destination address for the packet. ("Packets" or "data packets"—both of which are used in the present specification and claims, include traditional data packets and their functional equivalents, such as "cells", "frames", "datagrams", or the like, whether in a connection-oriented or other type of network.) Accordingly, in connectionless communication, each packet of information includes a unique identifier that indicates the source device of the packet and the destination device for the packet. Generally, only the destination device identifier is used in routing the packet. Thus, when a network forwarding device (e.g., hub, router, bridge, brouter, etc.) receives a packet with a given destination address, that device will generally handle the packet in the same manner—filtering the packet or forwarding the packet to the same out port. Most existing network topologies employ destination address-based procedures for determining the flow of communication packets.

In a connection-oriented communication, a logical association is established between a source device and a destination device, so that groups of packets may be sent along the same "path". (In a connectionless communication network, no "path" is formally established for a particular packet.) In general, there are three phases which occur during a connection-oriented communication: connection establishment; data transfer; and connection termination. In the connection establishment phase, the first time a particular source device has data to be sent to a destination device, a logical association, also called a "connection" or a "path", is established between the source and destination devices. The connection defines ports on devices in the path through which data from the source device will pass to the destination device. The path set up at the establishment phase is the path on which the data will be transmitted between the specific source and destination devices for the duration of the active connection. During the data transfer phase, data is transmitted from the source device to the destination device along the connection path. Generally, after a certain amount of time, or at the occurrence of a certain event, the connection enters a termination phase, at which time the connection is terminated.

A specific "path" may be selected through the network for a given individual data packet, such that each packet follows a specific route or "connection" through the network. In such a case, the individual packet itself could specify the specific route through the devices on the network. Alternatively, the source address (in combination with the destination address) for a packet could be used to identify a path through the devices. In this case, each destination/source address pair could be used to uniquely identify a path through the communications network and each switch would know how to handle a packet corresponding to the pair (and/or coupled with an inport). Assignment of the path through the network could be done either through a central management site or through a distributed mechanism. Connection-based networks offer an opportunity to improve network efficiency (e.g., the effective bandwidth of the network) and to provide additional service to network users.

U.S. Pat. No. 5,485,455 to Dobbins et al., issued Jan. 16, 1996, illustrates a particularly advantageous embodiment of a connection-based network, using a management agent to establish the mapping of destination/source address pairs in a communications path, and is hereby incorporated by reference in its entirety.

Both connection-based and connectionless communication networks rely on a particular system protocol: a set of conventions between communicating devices/processes regarding the format and content of messages to be exchanged. For example, the Institute of Electrical and Electronics Engineers (IEEE) has developed a number of network standards including: IEEE 802.3 relating to Ethernet buses using carrier sense multiple access and collision detection; IEEE 802.4 relating to token buses using token passing; and IEEE 802.5 relating to token ring networks using token passing. The American National Standards Institute (ANSI) has also developed a standard for fiber distributed data interface (FDDI) using multiple token passing.

The destination/source addresses for both connection and connectionless communication systems described above may be defined by a Media Access Control frame protocol (referred to as "MAC" frame), for example. A MAC frame packet is a connectionless packet described in IEEE Publication 802.3. As described therein, a MAC frame generally contains the following fields: preamble; start frame delimiter; destination address; source address; type/length field; payload (e.g., data and padding); and frame check sequence. The destination address, source address and type field are usually labeled as a "header".

Also useful in the present invention are methods for establishing a point-to-multipoint connection, such as those described in U.S. Pat. No. 5,627,819 to Dev et al., which issued May 6, 1997, and is hereby incorporated by reference in its entirety.

Remote Mirroring

Figure 2:
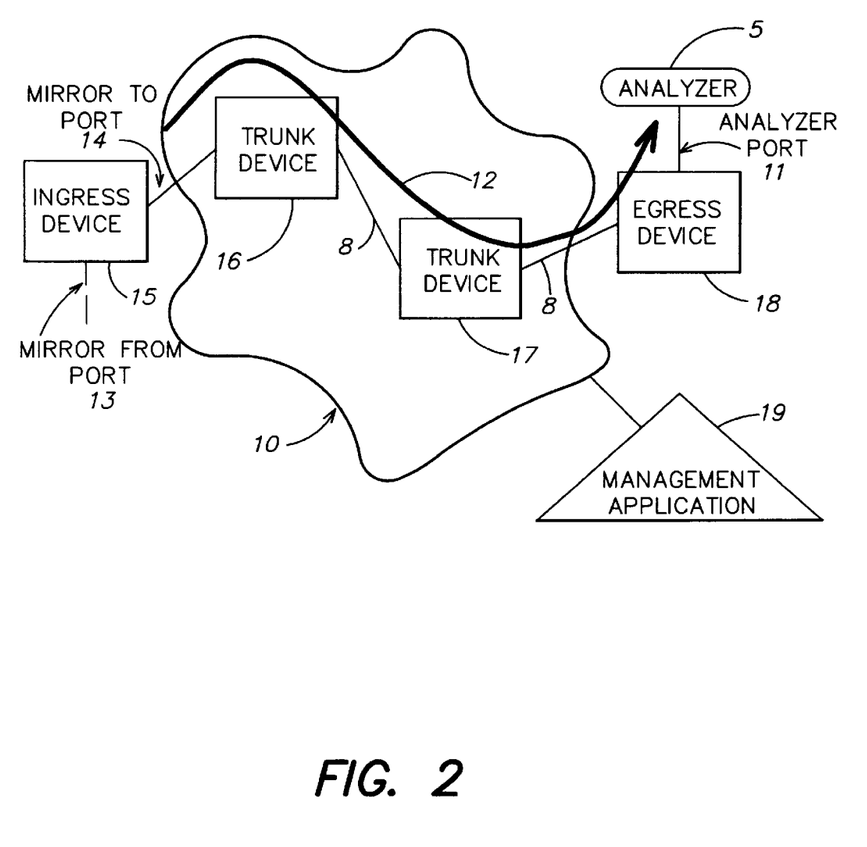
FIG. 2 is a block level diagram showing a network monitored with remote port mirroring according to one embodiment of the present invention.

FIG. 2 illustrates, by way of example, part of a network system in which a source device is monitored by a remote analyzer. The source device is referred to as an ingress device 15 for so long as the device is being monitored, and can be any one of the network communication devices (e.g., devices 1–4, 6 and 9 in FIG. 1). Ingress device 15 may have multiple ports through which packets may be received and sent.

In FIG. 2, port 13 has been selected as the port to be monitored. Thus, in this example, device 15 is the ingress device and port 13 is the "mirror-from-port." A "mirror-to-port" 14 is the out port on ingress device 15 that is on a path 12 set up through the connection-oriented network 10 to the egress device 18.

All packets received and sent by the port 13 are also copied and transmitted through the network 10 to analyzer 5, located off analyzer port 11 of egress device 18. The "egress device" is the device on the network that is used to monitor the mirror-from-port 13 on the ingress device 15. Any device may be selected as the egress device. Typically, analyzer 5 is connected to the egress device. While port mirroring occurs, the other ports on the ingress and egress devices continue to function as in any other port on any other device in the network, receiving and sending information between the devices, but not participating in the remote port mirroring process described below. A management application 19 coupled to the network 10 (e.g., running on a network management station) is responsible for configuring the network and/or establishing a connection path.

Ingress device 15 is connected to the egress device 18 through trunk devices (16 and 17) in switch cloud 10 (where the term "trunk" devices refers to all intermediate devices between the ingress and egress devices). In a typical network, there are potentially multiple routes or paths through the network topology between the ingress and egress devices.

Figure 5A:
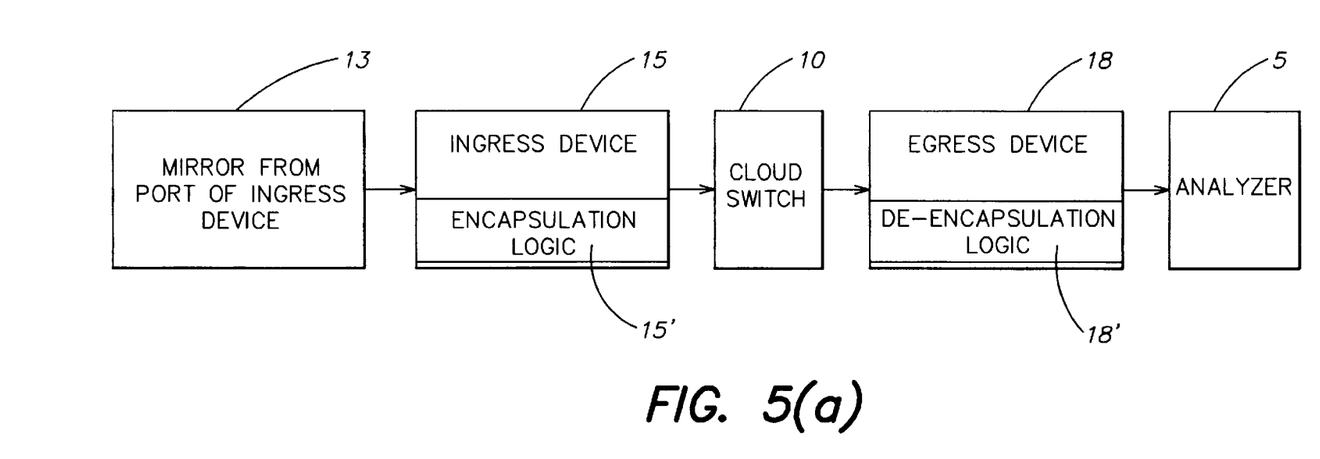
FIG. 5(a) is a simplified block diagram of the path through the switched network from the ingress device to the analyzer.

To accomplish the remote port mirroring function, ingress device 15 includes encapsulation logic 15', and egress device 18 includes a de-encapsulation/extraction logic 18' (see FIG. 5a). The encapsulation and de-encapsulation functions are described in more detail below.

Figure 3:
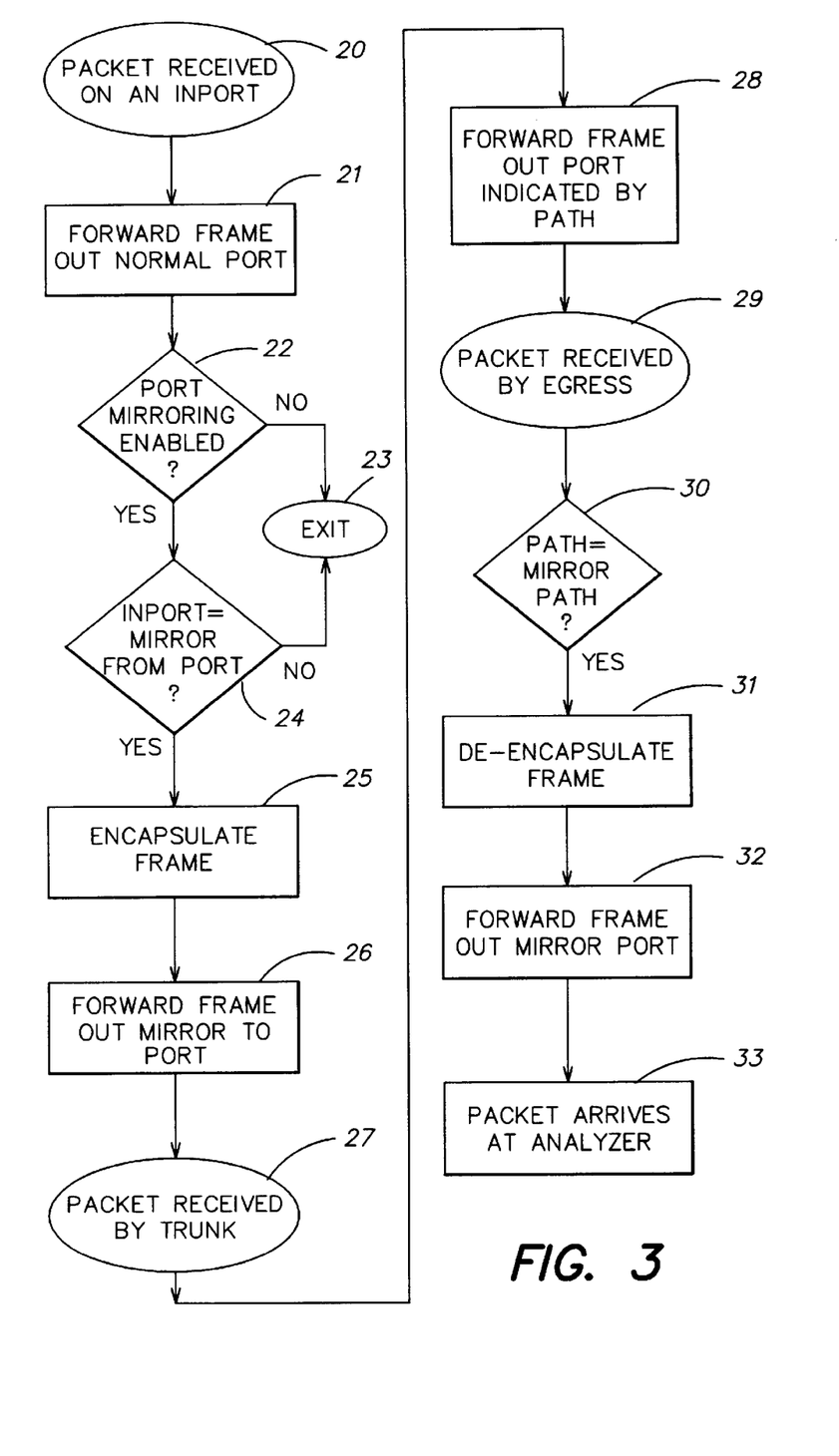
FIG. 3 is a flow diagram of an exemplary process according to one embodiment of the present invention.

FIG. 3 illustrates in greater detail, with reference to FIGS. 1 and 2, a process in which a port of a device is monitored according to one embodiment of the present invention. In step 20, a packet is received on an in port, (e.g., 13) of a device (e.g., ingress device 15). In step 21, the packet, having an original destination address provided in its original header (described below with reference to FIG. 5b), proceeds to a port on the device from which it is sent to the device having the destination address, according to whatever mechanism is used in the network to route/switch packets.

Then, a decision 22 is made: is the port mirroring process enabled for this port? (This is determined during a set-up and configuration process, as described with reference to FIG. 4 below.) If not, the process is complete and exits at step 23.

If the answer to decision 22 is yes, a subsequent decision 24 must be made: is the port on which the packet was received the "mirror-from-port"? (i.e., is the in-port on which the packet was received the port to be monitored and therefore mirrored?) (e.g., with reference to FIG. 2, port 13 is the "mirror-from-port" and therefore the answer to decision 24 is yes). If yes, in step 25, the packet proceeds to an encapsulation step in which the packet is modified by encapsulation logic (e.g., 15') in ingress device (e.g., 15), as described below. If the result of decision 24 is no (i.e., the in-port is not the port selected to be monitored and therefore mirrored), the process terminates in exit step 23.

As described above, a packet that reaches the encapsulation step 25 is intended to be sent to analyzer 5 through a connection path established in a set-up and configuration process, described below. In order to send the packet to the analyzer, rather than to its original destination as specified by its original header, the packet is prepended by encapsulation logic (e.g., 15') in the ingress device with a new header. The prepended header, described below, specifies the path to be traversed in order for the packet to reach analyzer 5. Once the packet is encapsulated with the prepended header, the modified (encapsulated) packet can take the established path through the switch cloud (e.g., 10), independent of the destination present in its original header.

In step 26, the encapsulated packet is transmitted through the "mirror-to-port" (e.g., 14). The packet is then automatically switched through the network, according to the prepended header, to the egress device and analyzer. In steps 27–28, the encapsulated packet proceeds in series through the trunk devices on the path. As mentioned above, since multiple paths may be formed by the trunk devices in the switch cloud, the prepended header selects one of these paths (i.e., a pre-established path).

In step 29, the encapsulated packet is received by the egress device. Then a decision 30 is made: is the received packet a modified packet sent on the preestablished path in order to be monitored by the analyzer? If the prepended header indicates the preestablished path, the modified packet proceeds to a de-encapsulation step 31. In de-encapsulation step 31, the modified packet is returned to its original form by having de-encapsulation logic (e.g., 18') in the egress device remove the prepended header.

Following the de-encapsulation step, in step 32, the frame in its original form is forwarded to the analyzer port (e.g., 11) which is coupled to an analyzer (e.g., analyzer 5). In step 33, the packet, in its original form, arrives at the analyzer, allowing the analyzer to monitor the original packet and thus monitor the port from which the packet originated by the method of remote port mirroring of the present invention.

Figure 4:
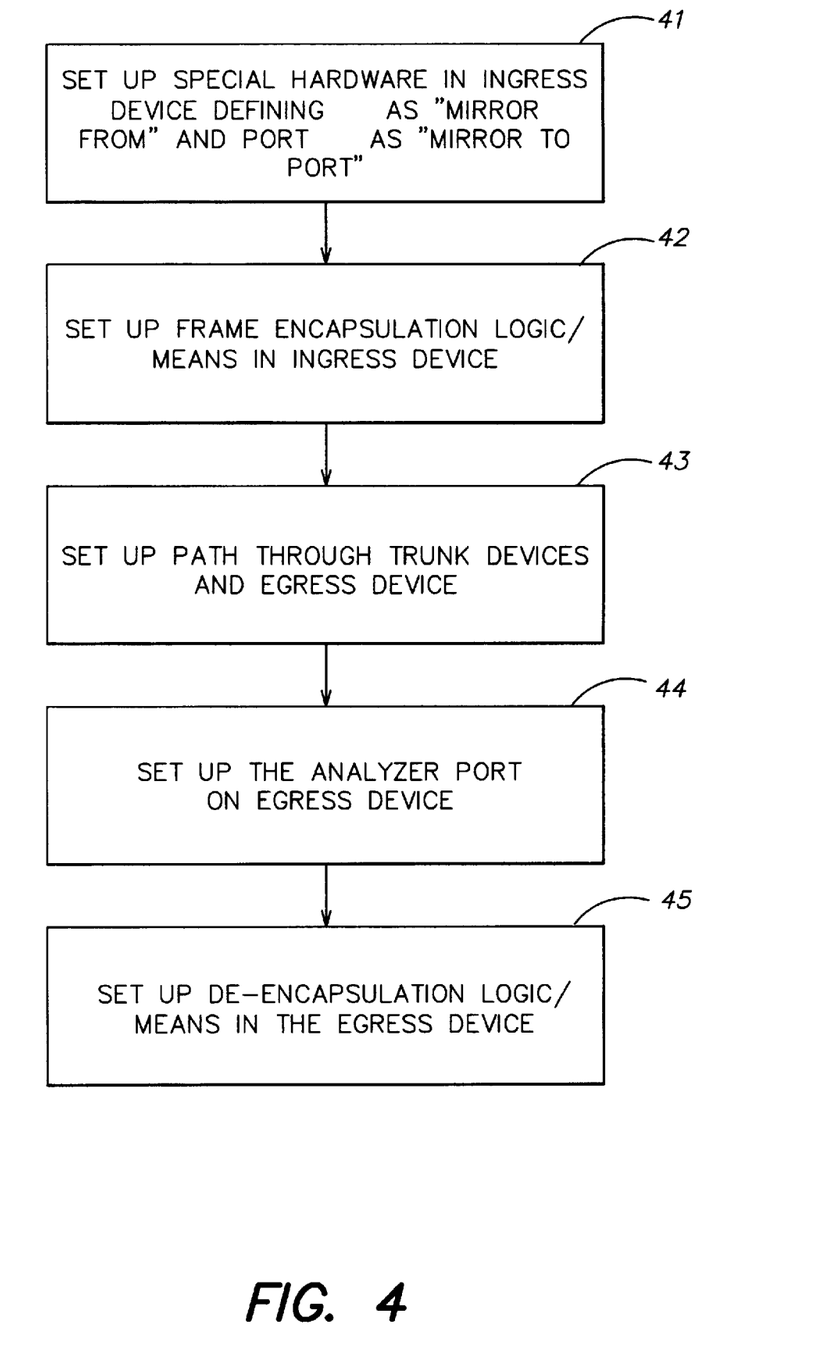
FIG. 4 is a flow chart of an exemplary set-up and configuration through which remote port mirroring may be achieved.

FIG. 4 provides an example of set-up and configuration through which remote port mirror is enabled in the network and a port is selected to be monitored.

In step 41, a port on a device in the network is selected to be monitored (i.e., a device is designated as an ingress device). Special hardware (and/or software) is set-up in the ingress device (e.g., 15), defining one port (e.g., port 13) as the "mirror-from-port" and one port (e.g., port 14) as "mirror-to-port". In step 42, frame encapsulation logic (e.g., 15') is set up in the ingress device (e.g., 15). In step 43, a path, (e.g., path 12), is set-up from a specific out-port of the ingress device (e.g., "mirror-to-port" 14) through the trunk devices (e.g., 16 and 17) to the egress device (e.g., 18).

As described above, in a network having multiple devices forming multiple paths between the ingress and egress devices, one path in the switch cloud is chosen through which the packet is sent. This path may be determined as it would be for any other packet communicated in the network. For example, according to the system of U.S. Pat. No. 5,485,455 (Dobbins et al.), a network management agent will program the path. A method for defining a pre-established path having a virtual circuit ID is described in copending and commonly owned U.S. Ser. No. 08/657,414 filed Jun. 3, 1996 by Belser et al. entitled "Connection Aggregation Switched Communications Networks" (docket C0441/7082), which is hereby incorporated by reference in its entirety.

In step 44, the analyzer port (e.g., 11) is set-up on the egress device (e.g., 18). In step 45, a de-encapsulation logic (e.g., 18') is set-up in the egress device. Each set-up step can be achieved by management application and/or user intervention and/or device firmware intervention, by corresponding hardware, software and firmware mechanisms.

The timing and/or order of the steps described above with reference to FIG. 4 is not exclusive. For example, the path may be set up in advance or, as above, at the time that a particular device is selected to be monitored. Similarly, encapsulation and or de-encapsulation logic or means can be installed in advance for the entire network or selectively installed on devices to be monitored as the particular ingress devices in turn are selected.

When monitoring is complete, remote port mirroring is terminated, for example, by setting a bit, register or memory element to indicate that the particular port is no longer being mirrored. With reference to FIG. 3, the result of decision 22 is no (i.e., the monitoring process is no longer enabled) and/or once the result of decision 24 is no (i.e., the in-port on which packets are received is not the "mirror-from-port" to be monitored), future packets will not be mirrored. As such, the "ingress" device is no longer designated as such but is now merely a generic device in the network. One or more other ports may now be monitored. For monitoring multiple ports at the same time, the egress device and/or analyzer would have a means of distinguishing the source of the data (e.g., an identifier in the encapsulated packet).

Thus, the process of remote port mirroring according to the present invention does not require a permanent dedicated mirroring port to be installed or configured on each device to be monitored, but rather allows the temporary transformation of any port on a device into a special "mirror-from-port" and/or "mirror-to-port". Second, the analyzer and monitoring equipment need not be located at the same physical location as; the device being monitored and third, network personnel need not be dispatched to the location of the device being monitored.

As mentioned above, throughout the monitoring process described with reference to FIG. 2, the original packet travels to its original destination. The original packet arriving at the "mirror-from-port" and traveling on to its original destination, by way of an example, can be a MAC frame packet described in IEEE Publication 802.3, discussed above.

Figure 5B:
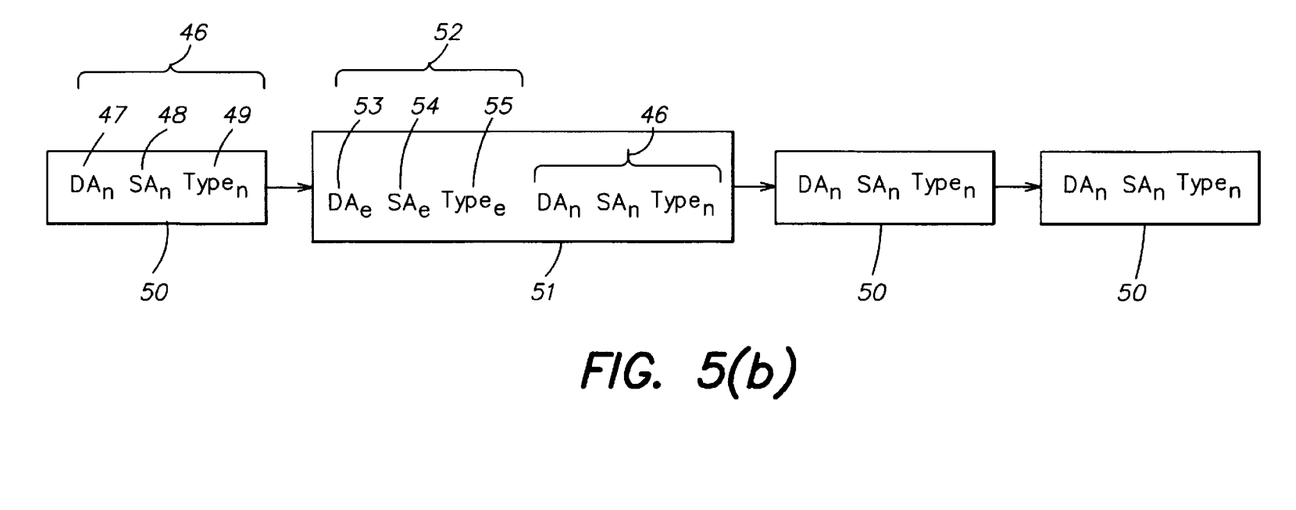
FIG. 5(b) is a flow diagram of a packet being encapsulated and then de-encapsulated as it traverses the path through the switched network.

FIG. 5 illustrates an original header portion 46 of an original MAC packet 50 having three fields, 47, 48 and 49. Field 48, labeled "$DA_n$", is the unique MAC (Media Access Control) address of a destination to which the packet is originally intended. Field 48, labeled "$SA_n$", contains the MAC addresses of the port and device from which data is initiated. Field 49, labeled "$Type_n$", contains the IEEE defined ethertype field.

When a packet is encapsulated in encapsulation logic 15', original packet 50 is prepended with a header which provides a new destination/source address pair directing the packet through the connection path. As shown in FIG. 5(b), header 52 is prepended onto the original header portion 46 of the packet. Prepended header portion 52 includes three fields, 53, 54, and 55. Field 53, labeled "$DA_e$", is the unique MAC address of analyzer 5. Field 54, labeled "$SA_e$", contains the MAC address of the port to be mirrored (e.g., port 13 of ingress device 15). Field 55, labeled "$Type_e$" contains the IEEE defined ethertype field, which contains information regarding the type of packet, for example, whether special processing is needed. Prepended header portion 52 defines a virtual path (i.e., the connection path) through which the packet will flow, until reaching analyzer 5.

The three fields 53–55 may have the following field sizes. The first field 53 contains a 48-bit MAC address of the egress device (e.g., 18) and the remote mirroring port (e.g., 11) which is connected to the analyzer (e.g., 5). The second field 54 contains a 48-bit address of the ingress device (e.g., 15) and the mirror-from-port (e.g., 13) which is connected to it. The third field 55 contains 16-bits of type information.

Upon reaching egress device 18, the modified packet 51 (having the prepended header 52), is processed by de-encapsulation logic 18', where the prepended header 52 is removed. The original packet 50 is now available to analyzer 5.

FIGS. 5(a) and 5(b) in conjunction show one example of a packet being forwarded through the main elements of the network shown in FIG. 2. In the "mirror-from-port" 13, the original packet has an original header $DA_n$-$SA_n$-$Type_n$. At ingress device 15, the original packet is modified by encapsulation logic 15', where a prepended header $DA_e$-$SA_e$-$Type_e$ is prepended on the packet. Modified packet 51 enters cloud 10. Arriving at egress device 18, modified packet 51 is processed by de-encapsulation logic 18', where prepended header $DA_e$-$SA_e$-$Type_e$ is removed. Finally, the original packet $DA_n$-$SA_n$-$Type_n$ 50 arrives at analyzer 5.

The encapsulation and de-encapsulation logic can be implemented using one of a variety of mechanisms. For example, the functions could be implemented using software on a general purpose processor. In many applications, however, this mechanism may prove too slow. Accordingly, firmware and/or special purpose hardware may be employed. For example, the prepended (encapsulation) header may be stored in registers or other form of memory. The mirrored packet may then be output to the "mirror-to-port" using a multiplexer to first forward the prepended header to the mirror-to-port and then forward the actual packet to the mirror-to-port. Alternatively, the mirrored packet could be constructed (using one of the foregoing mechanisms or any other mechanism) in a buffer memory for transmission all at once. Similarly, the de-encapsulation logic may be implemented using software in a general purpose processor or using custom hardware to strip prepended headers from received mirrored packets.

The above embodiment assumes that the network can handle variable length packets. That is, a mirrored packet is longer than the original packet—and includes a prepended header as well as all of the information in the original packet. In networks where packets are required to have fixed length, received packets can be partitioned into multiple mirrored packets, for reassembly at the egress device.

Portions of the above embodiments may be implemented on a computer apparatus which performs the functions of any of the previous embodiments. Alternatively, the invention may be embodied by a computer program or data structure, stored in memory, such as a floppy disk, compact disk, or hard drive, which contains instructions and data to be provided to a general purpose computer for carrying out the functions of the previous embodiments.

Having thus described one embodiment of the invention, various modifications and improvements will readily occur to those skilled in the art. While the above embodiment is described in the context of a MAC-based, connection-oriented LAN, this is not intended to be limiting. The invention is useful in other network technologies, LAN or WAN, IEEE standard compliant or otherwise, and connection-oriented or otherwise.

Accordingly, the foregoing description is by way of example only and is not intended to be limiting.

I claim:

1. A method of remote monitoring of a device port in a connectionless communications network having a plurality of IEEE 802 compliant devices coupled together, the method comprising steps of:

selecting a first port of a first device to be monitored and from which to mirror MAC frame packets;

selecting a second port of the first device to which to mirror the MAC frame packets;

selecting a first port of a second device remotely located from the first device and connected to said connectionless communications network, said first and second devices being IEEE 802 compliant devices;

selecting a second port of the second device and connecting an analyzer to the second port of the second device;

mirroring the MAC frame packets from the first port of the first device to the second port of the first device;

encapsulating the MAC frame packets of the first port of the first device by appending an IEEE 802 MAC header including an address of the second port of the second device;

sending the encapsulated MAC frame packets through the connectionless communications network to a remote location of the second device; and monitoring the first port of the first device by the MAC frame packets received at the second port of the second device by employing said analyzer.

2. The method of claim 1, wherein the step of appending the header includes first retrieving the header stored in a memory.

3. A method of converting an IEEE 802 compliant network device to an ingress device for remote port monitoring over a connectionless communications network including a plurality of IEEE 802 compliant devices, the method comprising steps of:

selecting a first port to be monitored on the ingress device as a mirror-from-port;

selecting a second port on the ingress device as a mirror-to-port;

enabling, on the ingress device, means for mirroring MAC frame packets from the mirror-from-port to the mirror-to-port; and activating an encapsulation logic for encapsulating the MAC frame packets by appending an IEEE 802 MAC header including an address of monitoring device and enabling transmission of the encapsulated packets from the second port through the communications network to the monitoring device located remotely from the ingress device.

4. A method of remote port monitoring in a connectionless communications network from a egress device coupled to the network, the method comprising steps of:

selecting a mirror-from-port to be monitored on an IEEE 802 compliant ingress device coupled to the network;

selecting a mirror-to-port on the ingress device;

selecting an analyzing port on an IEEE 802 compliant egress device for remote monitoring of the mirror-from-port, the egress device being remotely located from the ingress device and connected over the network including a plurality of IEEE 802 compliant devices;

encapsulating MAC frame packets received or transmitted on the mirror-from-port by appending an IEEE 802 MAC header including an address of the analyzing port and sending the encapsulated packets out the mirror-to-port through the network to a remote location of the analyzing port of the remote egress device; and de-encapsulating and monitoring the packets received at the analyzing port.

5. An IEEE 802 compliant ingress device for remote port monitoring in a connectionless communications network including a plurality of IEEE 802 compliant devices coupled together, the ingress device comprising:

a mirror-from-port to be monitored at which MAC frame packets are transmitted or received;

a mirror-to-port;

an encapsulation logic for encapsulating all MAC frame packets that are monitored at the IEEE 802 compliant ingress device, the encapsulation logic encapsulating the MAC frame packets of the mirror-from-port by appending an IEEE 802 MAC header including an address of a remotely located IEEE 802 compliant device; and means for transmitting the encapsulated MAC frame packets to the remotely located device in the network.

6. The device of claim 5, wherein the mirror-from-port and the mirror-to-port are standard ports on a network device temporarily transformed and configured for mirroring.

7. A system for remote monitoring of a device port in a connectionless communications network comprising:

a first port to be monitored on a first device, said first device being IEEE 802 compliant device;

an encapsulation logic in the first device arranged to encapsulate all MAC frame packets, transmitted or received at the first port of the first device, for transmission from the first device; said encapsulation logic encapsulating the MAC frame packets by appending an IEEE MAC header including an address of the destination port;

a second device including a first port and a second port and being IEEE 802 compliant, the first port of the second device being connected by the connectionless communications network to the first device; th second device being the destination port arranged to receive all encapsulated packets over the communications network from the first device; and an analyzer connected to the second port of the second device and arranged to remotely monitor operation of the first port of the first device.

8. The system of claim 7, wherein the first device or the second device is a switch.

9. The system of claim 7, wherein the first device or the second device is a router.

10. The system of claim 7, wherein the first device or the second device is a bridge.

11. The system of claim 7, wherein the encapsulation logic is implemented by a general purpose processor.

12. The system of claim 7, wherein the second device includes a de-encapsulation logic arranged to de-encapsulate the packets transmitted form the first device to the second device.

13. The system of claim 12, wherein the analyzer is arranged to receive the de-encapsulated packets.

14. The system of claim 13, wherein the de-encapsulation logic is implemented by a general purpose processor.

15. The system of claim 7, wherein the the first port of the first device is a standard port on a network device temporarily transformed and configured for mirroring of packets transmitted or received at the first port of the first device.

16. The system of claim 7, wherein the communications network is arranged to handle packets of a variable length.

17. The system of claim 7, wherein the communications network is arranged to handle packets of a fixed length, the first device being arranged to partition the packets, transmitted or received at the first port and encapsulate the partitioned packets, the second device being arranged to reassemble the partitioned packets and provide the reassembled packets to the analyzer connected to the second port of the second device.

* * * * *